United States Patent [19]

Oguma et al.

[11] Patent Number: 4,961,322
[45] Date of Patent: Oct. 9, 1990

[54] FRESH FOOD STORING DEVICE

[75] Inventors: Tomio Oguma, Anjo; Yasuhiro Aso, Toyota, both of Japan

[73] Assignee: Aisin Seiki Kabushiki Kuisha, Japan

[21] Appl. No.: 291,144

[22] Filed: Dec. 28, 1988

[30] Foreign Application Priority Data

Dec. 28, 1987 [JP] Japan ................. 62-333064
Dec. 28, 1987 [JP] Japan ................. 62-333067

[51] Int. Cl.⁵ ............................................. A23K 3/02
[52] U.S. Cl. ........................................ 62/179; 62/78; 62/48.1; 426/419
[58] Field of Search ................... 62/78, 179, 48.1; 426/419; 422/40; 99/467, 470

[56] References Cited

U.S. PATENT DOCUMENTS

| | | | |
|---|---|---|---|
| 3,102,777 | 9/1963 | Bedrosian et al. | 426/419 X |
| 3,239,360 | 3/1966 | Dixon | 62/64 X |
| 3,487,769 | 1/1970 | Dixon | 426/419 X |
| 4,537,043 | 8/1985 | Volker | 62/78 |

Primary Examiner—William E. Wayner

[57] ABSTRACT

A storing volume is formed within a box which also houses a temperature detector for detecting the temperature of the gas within the storing volume, a cooling mechanism for cooling the interior of the storing volume, a nitrogen-rich gas supplying device, for supplying nitrogen-rich gas into the storing volume, and a controller which functions in such a manner that it activates the cooling mechanism in response to signals from the temperature detector in order to control the temperature of the interior of the storing volume, and also activates the nitrogen-rich gas supplying device in response to the variation of the gas contents of the storing volume in order to control the gas contents of the storing volume. Due to the function of the nitrogen-rich gas supplying device, the nitrogen concentration can be maintained within the storing volume at a proper level all the time, and therefore the respiration of the fresh foods stored in the storing volume is inhibited, thereby contributing to keeping the fresh foods in a fresh state, and preventing rotting. Further, a pressure regulator prevents the leaking of the cooled nitrogen-rich gas from the interior of the storing volume to the outside.

6 Claims, 9 Drawing Sheets

FRESH FOOD STORING DEVICE

BACKGROUND OF THE INVENTION

1. Field of the Invention

The present invention relates to a box type fresh food storing device for storing fresh foods such as vegetables, fruits, cereals, meats, eggs, milk products and the like. The device of the present invention is for use in the form of a box type fresh food storing unit installed on the floors of homes, liquor stores and supermarkets.

2. Discussion of the Related Art

A fresh food storing device for storing in a fresh state vegetables, fruits, cereals and the like is disclosed in Japanese Patent Publication No. Sho-601200, in which a gas generating unit is installed for producing carbon dioxide gas by burning a high carbon purity solid fuel or liquid fuel. Thus the produced gas containing carbon dioxide is supplied to the fresh food storing volume in order to inhibit the respiration of the fresh foods Another fresh food storing device is disclosed in Japanese Patent Publication No. Sho-59-14749 which describes a large scale storing plant, and in which a nitrogen-rich gas is supplied to the storing volume.

In the device disclosed by Japanese Patent Publication No. Sho-60-1200, combustion is used and therefore it is inconvenient to use in homes and stores, because there is the possibility of fire and toxic effects due to the existence of carbon monoxide, thereby making the device undesirable in view of safety.

Meanwhile the device disclosed by Japanese Patent Publication No. Sho-59-14749 is not applicable to homes and small stores, but is for use in large storage plants.

SUMMARY OF THE INVENTION

The present invention is intended to overcome the disadvantages and the limitations of the devices of the prior art.

Therefore it is an object of the present invention to provide a fresh food storing device which is suitably installed on the floors of homes and stores.

For achieving the above and other objects, the present invention comprises a storing volume for storing fresh foods, a box surrounding the storing volume and containing a detecting means for detecting the temperature of the gas in the storing volume, a cooling unit for cooling the interior of the storing volume formed within the box, a nitrogen-rich gas supplying device for supplying a nitrogen-rich gas into the storing volume formed within the box, and a controller for controlling the cooling unit in order to regulate the temperature of the interior of the storing volume in response to a signal from the temperature detecting means, and for controlling the nitrogen-rich gas supplying device to regulate the content of the nitrogen gas within the storing volume in response to the detection of the contents of the gases within the storing volume.

The storing box of the present invention can be made in the form of a longitudinally long type, a laterally long type, one adopted to a system kitchen, one buried into a wall, or one adapted to cars. The shape of the box can be properly determined and, for example in the case where it is installed in a room, it can be made of the longitudinally long type in order to save space. The material of the box can be a metal or synthetic resin, and is not subjected to any special limitation. The walls of the storing volume can be wrapped with a heat insulating material. The shape of the storing volume, for example, can be made longitudinally long, and the box can be provided with a pressure regulating means. In the case where such a pressure regulating means is used, the interior of the storing volume is maintained in a sealed state, and if the pressure of the interior of the storing volume is raised to an excessive level, the pressure regulating means is activated to discharge gas out of the storing volume. Thus, as the pressure regulating means is activated only when an excessive level of gas pressure is reached, the leaking of gas from the storing volume can be prevented. The pressure regulating means may, for example, comprise a discharge opening leading from the interior of the storing volume to the outside, and an opening/closing member which normally closes the storing volume and opens when the gas pressure of the storing volume reaches a predetermined level. The bottom of the box can be provided with supporting legs.

As to the temperature detecting means for detecting the temperature of the interior of the storing room, a known type of temperature sensor, for example, a shape memory alloy, can be used. It is desirable to provide the box with an oxygen detecting means for detecting the oxygen concentration within the storing volume. As the oxygen detecting means, a known type of oxygen sensor can be used. In response to oxygen detection by the oxygen detecting means, the controller will activate the nitrogen-rich gas supplying device for supplying the nitrogen-rich gas into the storing volume. The controller may be composed of logic circuits in microcomputer, or can be composed of hard wired logic circuits. The controller also can intermittently activate the nitrogen-rich gas supplying device by outputting the driving signals as time passes. In this case, an external timer, that is an internal timer of a CPU, can be used to calculate the passing of time so that if the predetermined time is elapsed, the nitrogen-rich gas supplying device will be activated.

The box can also be constituted such that an oxygen supplying device is provided for supplying oxygen gas or a gas containing oxygen gas into the storing volume. As the oxygen supplying device, a compressor for supplying the external air into the storing volume can be used. When the oxygen detecting means indicates an oxygen content level lower than the predetermined level, the controller will activate the oxygen supplying device, while if the oxygen detecting means indicates an oxygen content level higher than the predetermined level, the controller will activate the nitrogen-rich gas supplying device so that a nitrogen containing gas can be supplied into the storing room. It is also desirable to provide a circulating device for circulating the gas in the interior of the storing volume and, as the circulating device, a fan can be used. It is of course possible that the circulating device is operated all the time, is operated intermittently at predetermined intervals, or is operated each time the nitrogen-rich gas is supplied to the storing volume by the nitrogen-rich gas supplying device. If the gas of the storing volume is curculated, the biased concentration of the gas within the storing volume can be reduced, and the fresh foods can be kept in a uniformly distributed gas, thereby preventing the rotting of the foods. The position of the circulating device can be properly determined according to need.

As the nitrogen supplying device, a nitrogen concentrating device can be used in which external air is used to concentrate nitrogen gas. The position of the nitrogen supplying device to be installed in the box is not limited and, for example, it can be disposed at the rear of the storing volume or at the bottom of the storing volume. In a preferred embodiment, the nitrogen-rich gas supplying device comprises a separating tank having an oxygen absorbing portion and a compressor for supplying compressed external air into the separating tank. In the oxygen absorbing portion, an oxygen absorbing agent such as active carbon, zeolite and the like can be used. The separating tank can be designed as a vertical longitudinally long type for minimizing the occupying space. In the case where a plurality of separating tanks are used, they can be disposed in parallel either along the depth direction of the box or along the lateral direction of the box. In the case where a plurality of the separating tanks are disposed parallelly along the lateral direction of the box, it is advantageous to make the depth dimension of the boxes as small as possible. In some special cases, the nitrogen-rich gas supplying device can be provided with a liquid nitrogen tank in order to supply the nitrogen in evaporated gas form, or can be provided with a nitrogen bomb.

As will be described below, the fresh food storing device of the present invention can have a separating wall within the storing volume for providing partitions within the storing volume, in order to form a rear wall and a space. In such cases, the separating wall can be provided with a first opening and a second opening, and the evaporation mechanism of the cooling system can be disposed between the first and second openings to make it positioned in the space. Further, the outlet of the nitrogen-rich gas supplying device can be disposed between the evaporation mechanism and the second opening, and the circulating device can be disposed near the first opening. Further, a by-pass path connected to the storing room can be installed, and an ethylene remover can be installed at a position on the by-pass. In this case, the gas within the storing volume is circulated between the by-pass path and the storing volume by means of a pump driven by an actuator. Through such a circulation, ethylene can be removed by means of an ethylene removing member. As the material of the ethylene removing member there can be used a divalently bonded hydrocarbon rubber or resin, or hydrocarbon rubber or resin, or hydrocarbons without divalent bonding. For example, there may be used natural rubbers, polyethylene, polypropylene, active carbon, or potassium permanganate. The form of the ethylene removing member can be powder or foamed solid.

BRIEF DESCRIPTION OF THE DRAWINGS

The above objects and other advantages of the present invention will become more apparent by describing the preferred embodiments of the present invention with reference to the attached drawings in which.

DESCRIPTION OF THE PREFERRED EMBODIMENTS

Figure 1:
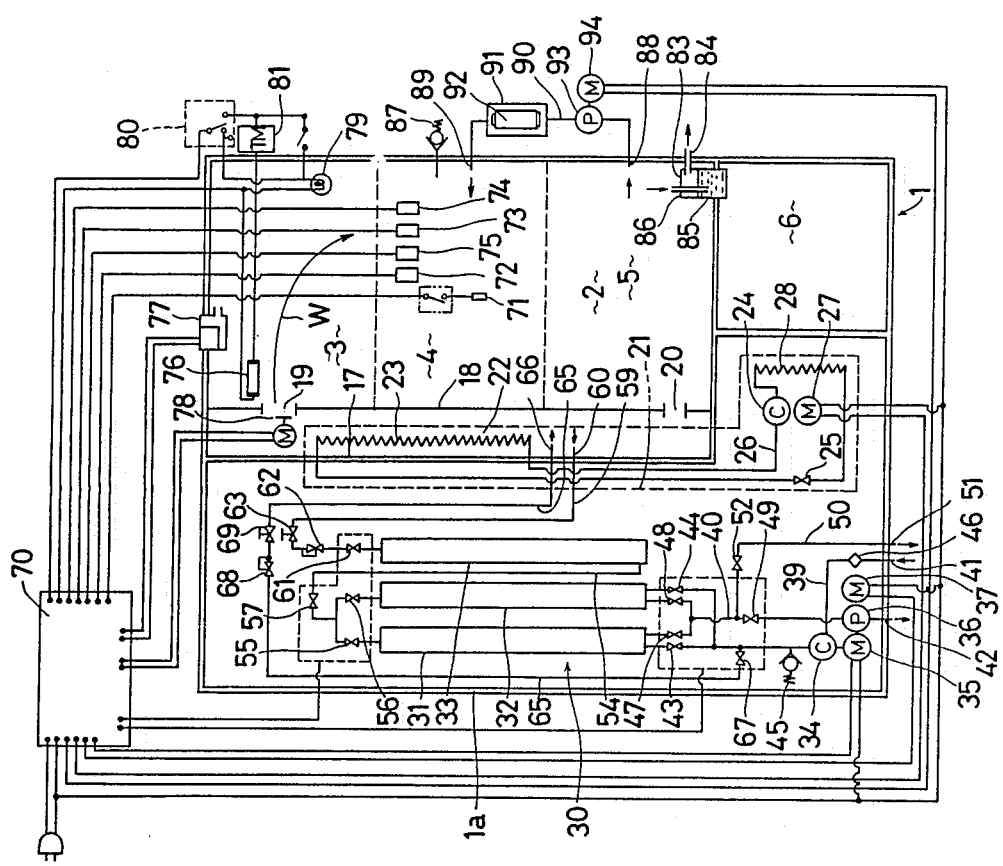
FIG. 1 is an exemplary view of the internal structure of the fresh food storing device according to an embodiment of the present invention.
Figure 2:
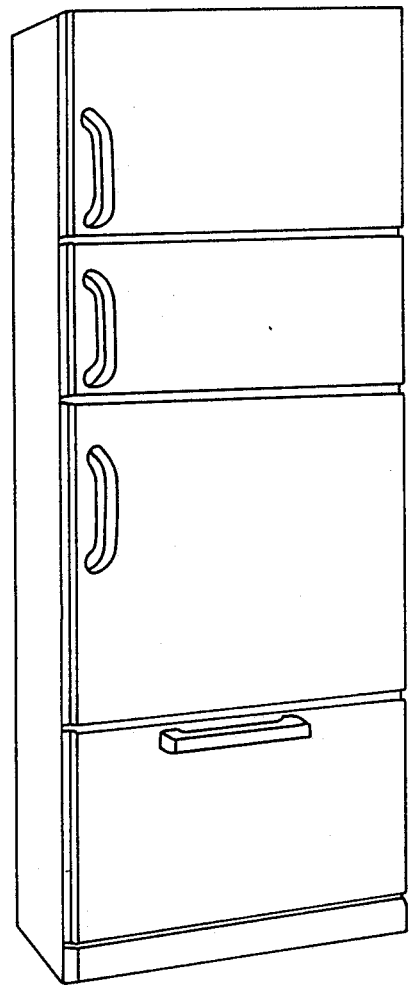
FIG. 2 is a perspective view of the resin food storing device of FIG. 1 with the door closed.
Figure 3:
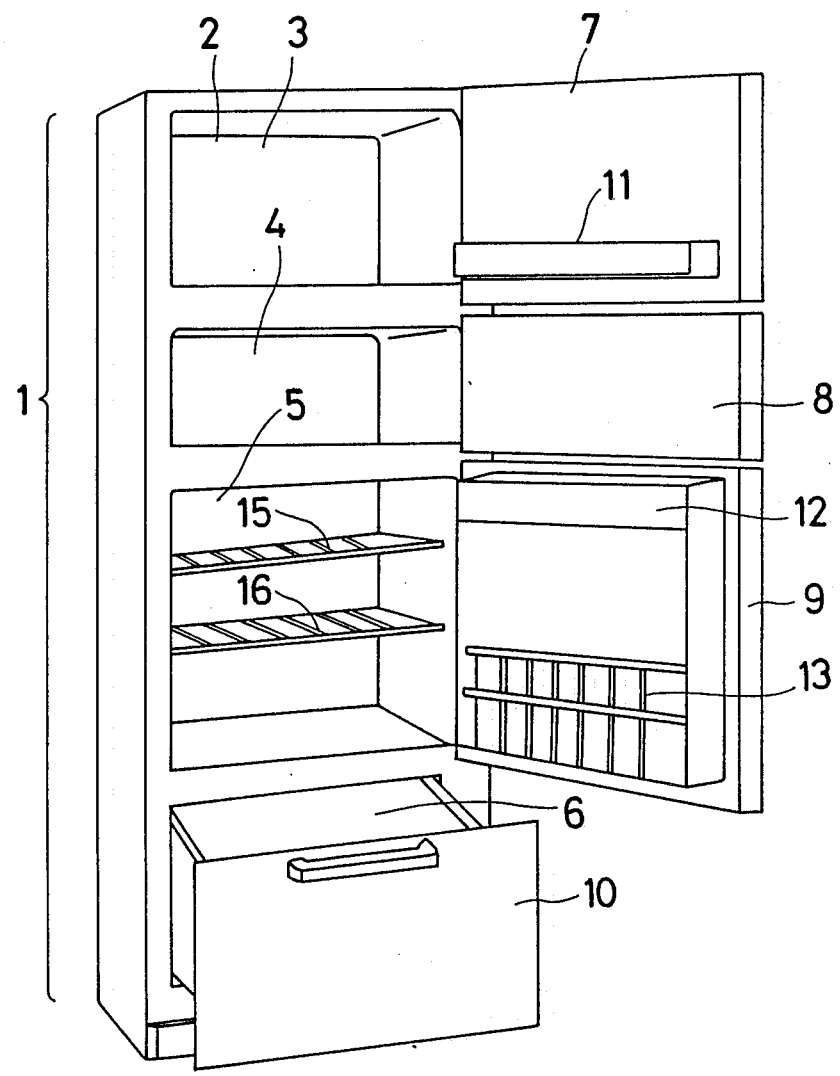
FIG. 3 is a perspective view of the fresh food storing device of FIG. 1 with the door open.

The first embodiment of the present invention will be described with reference to FIGS. 1 to 8. FIG. 1 shows an exemplary view of the internal constitution of the fresh foods storing device of the first embodiment, while FIGS. 2 and 3 respectively show perspective views of the device of the first embodiment with the door closed and with the door open. As shown in FIGS. 2 and 3, the box 1 has a vertically long shape for minimizing occupied space, and a storing volume 2 is formed within the box 1. The storing volume is partitioned into four vertically separated compartments: a first storing compartment 3, a second storing compartment 4, a third storing compartment 5, and a fourth storing compartment 6. The first, second and third storing compartments 3, 4, 5 are respectively opened/closed by means of first, second and third pivotal doors 7, 8, 9, while the further storing compartment 6 is opened/closed by means of a drawer type fourth door 10. The bottom of the box 1 is provided with supporting legs (not shown) There is installed a shelf 11 on the inside of the first door 7, and there are installed shelves 12, 13 on the inside of the third door 9. There are installed shelves 15, 16 within the third storing compartment 5.

Now the internal constitution of the fresh food storing device will be described with reference to FIG. 1. A separating wall 18 is disposed for keeping a certain gap between food stored in the device and a rear wall 17 which is one of the walls defining the storing volume 2. The separating wall 18 is provided with a first or upper opening 19 and with a second or lower opening 20. A cooling mechanism 21 is installed on the real wall 17 and at the bottom of the storing volume 2. The cooling mechanism 21 includes tubes 26 connecting the evaporation mechanism 23 disposed in the space 22 between the rear wall 17 and the separating wall 18 of the storing volume 2 to a condensating unit 28 disposed outside the storing volume 2 and to a compressor 24 and an expansion valve 25.

The compressor 24 is provided with a motor 27, and the motor 27 of the compressor 24 is installed at the bottom of the box 1. If the compressor 24 is activated, as in an ordinary cooling cycle, the cooling medium in the gas phase is compressed by the compressor 24 into a highly compressed state having a high temperature and then is sent to the condensating unit 28 where the compressed gas having a high pressure and a high temperature is condensed into a liquid. Then this condensed cooling medium is transformed into a fog having a low pressure and a low temperature to be introduced into the evaporation mechanism 23 where the cooling medium draws heat from the surface of the evaporation mechanism 23, thereby effecting heat absorption. Thus, the gas within the storing volume 2, especially the gas within the space 22 between the rear wall 17 and the separating wall 18, drops to a low temperature, for example to 2 to 5° C., and is maintained in that temperature range. A nitrogen-rich gas supplying device 30 is disposed within the box 1, and this nitrogen-rich gas supplying device 30 comprises a first separating tank 31 having absorbing agent such as an active carbon, a second separating tank 32 also having an absorbing agent such as an active carbon, a hollow nitrogen buffer tank 33, a compressor 34, a motor 35 for the compressor 34, a vacuum pump 36, and a motor 37 for the vacuum pump 36. The first separating tank 31, the second separating tank 32 and the nitrogen buffer tank 33 have an elongate shape respectively and are disposed in the vertical direction respectively. Further they are parallelly disposed at nearby positions to each other, and therefore they conveniently fit into the longitudinally long shape of the box 1, thereby contributing to the compactness of the box 1. Although they appear separated in the horizontal direction in FIG. 1, they are actually separated in the depth direction, i.e., into the plane of FIG. 1.

In this embodiment, the first separating tank 31 and the second separating tank 32 have a longitudinally long shape and therefore, compared with the case of a laterally long shape, they are advantageous in minimizing the gaps between the absorbing agent filled in the first separating tank 31 and the second separating tank 32 and the surface of the wall surrounding the first separating tank 31 and the second separating tank 32. Accordingly the absorbing agent can absorb the oxygen in the air in a more sure manner. The compressor 34, the motor 35 for the compressor, the vacuum pump 36, an the motor 37 for the vacuum pump are heavy, and therefore they are disposed near the bottom of the box 1 in order to provide a lower center of gravity. The first separating tank 31 and the second separating tank 32 connect to the outside of the box 1 through a concentrating tube 39 and a regenerating tube 40. An inlet 41 which is the leading end of the concentrating tube 39, and an outlet 42 which is the leading end of the regenerating tube 40, are disposed below the bottom of the box 1. Therefore, in the case where walls of the building and other structures are closely adjacent the side of the fresh food storing device, external air can be sucked in through the inlet 41 of the tube 39, and the gas can be discharged from the first separating tank 31 and the second separating tank 32 through the outlet 42 of the tube 40 regardless of the existence of such walls and other structures.

The tube 39 is connected to a valve 43, a valve 44, a safety valve 45, the compressor 34 and an air filter 46. The air filter 46 is for cleaning the incoming air, and is detachably installed for cleaning or replacement. The tube 40 has a valve 47, a valve 48, a valve 49 and the vacuum pump 36. The tube 40 is also connected to a tube 50, and an outlet 51 which is the leading end of the tube 50 is disposed below the bottom of the box 1. A check valve 52 is also installed on the tube 50. The first separating tank 31 and the second separating tank 32 are connected to the inlet of the nitrogen buffer tank 33 through a tube 54 which is in turn connected through a valve 55, a valve 56 and a valve 57. The outlet of the nitrogen buffer tank 33 is extended to the storing volume 2 through a tube 59, and the outlet 60 for the nitrogen-rich gas which is the leading end of the tube 59 reaches the interior of the storing volume 2. The tube 59 has a valve 61, a pressure reducing valve 62 and a flow regulation valve 63, and the tube 39 is connected to a tube 65, and to an air outlet 66 which is the leading end of the tube 65 reaching to the interior of the storing volume 2.

The tube 65 has a valve 67, a pressure reducing valve 68 and a flow regulation valve 69. The valves disposed at the inlet side of the first separating tank 31, such as the valve 67, the valve 43, the valve 44, the valve 47, the valve 48 and the valve 49 are connected to a controller 70. the valves disposed at the outlet side of the first separating tank 31, such as the valve 55, the valve 56, the valve 57 and the valve 61 are also connected to the controller 70. In this embodiment, the controller 70 installed on the box 1 is constituted by a microcomputer having an input interface, an output interface, a CPU and a memory.

If an nitrogen concentrating process is to be carried out in the first separating tank 31, first the valve 47 is closed, and then the compressor 34 is driven by means of the motor 35 with the valve 43 and the valve 55 put in an activate state. Then the external air will reach the valve 43 through the air filter 46 and the tube 39 for the air to be compressed and filled into the first separating tank 31. Then due to the difference between the absorption rates of nitrogen and oxygen in the separating tank, most of the oxygen is absorbed by the absorbing agent installed within the first separating tank 31, thereby carrying out the nitrogen concentrating process and forming a nitrogen-rich gas. Then the nitrogen-rich gas is delivered through the valve 55 and the valve 57 to the nitrogen buffer tank where the gas is subjected to lowering of its pressure. The nitrogen-rich gas is then delivered through the valve 61 to the pressure reducing valve 62 to be subjected to a further reduction of pressure and then is blown into the storing volume 2 through the flow regulation valve 63 and the nitrogen-rich gas outlet 60 which is the leading end of the tube 59.

If a regeneration process is to be carried out in the first separating tank 31, the valves 55, 43, 49 are closed as the first step, and then the valve 47 is opened so that the gas within the first separating tank 31 can be naturally discharged to the outside through the valve 47, the tube 40, the check valve 52 and the outlet 51. To carry out the second step of the regenerating process, the valve 49 is opened and the vacuum pump 42 is driven by means of the motor 37. then the gas within the first separating tank 31 is sucked off to be forcibly discharged through the outlet 42, thereby making the internal pressure of the first separating tank 31 drop to below one atmosphere in pressure. As a result of such suction, the absorbing agent installed within the first separating tank 31 is regenerated so that it can perform the oxygen absorbing function again.

If the nitrogen concentrating process is to be carried out in the second separating tank 32, first the valve 43 for the first separating tank 31 is closed, and then the compressor 34 is driven with the valve 44 open. Then, as described above, air is delivered under pressure to the second separating tank 32 through the air filter 46, the tube 39 an the valve 44. Then most of the oxygen is absorbed by the absorbing agent installed within the second separating tank 32, thereby carrying out the nitrogen concentrating process for producing a nitrogen-rich gas. This nitrogen-rich gas is delivered to the nitrogen buffer tank 33 through the valve 56 and the valve 57, to be subjected to lowering of pressure there. This gas is delivered through the valve 62 to the pressure reducing valve 62 to be subjected to a further reduction of pressure, and then is blown into the storing volume 8 through the flow regulation valve 63 and the nitrogen-rich gas outlet 60 which is the leading end of the tube 59.

If the regenerating process is to be carried out in the second separating tank 32, as the first step the valves 44, 56, 49 are closed and the valve 48 is opened to discharge the gas of the second separating tank 32 to the outside through the valve 48, the regeneration tube 40, the check valve 52 and the outlet 51. To carry out the second step of the regeneration process, the valve 49 is opened and the vacuum pump 36 is driven by means of the motor 37, so that the gas within the second separating tank 32 may be forcibly sucked away, thereby making the internal pressure of the second separating tank 32 drop to below one atmosphere in pressure. As a result of such a suction, the absorbing agent installed within the second separating tank 32 is regenerated, so that it is capable of absorbing the oxygen again. It should be noted that when a nitrogen concentrating process is being carried out in the first separating tank 31, a regenerating process is carried out in the second separating tank 32. On the contrary, if a nitrogen concentrating process is being carried out in the second separating tank 32, a regenerating process is carried out in the first separating tank 31.

Within the storing volume 2, there are disposed sensors such a thermostat 71 as the temperature detecting means, a humidity sensor 72 as the humidity detecting means, a carbon dioxide sensor 73 as the carbon dioxide detecting means, an ethylene sensor 74 as the ethylene detecting means, and an oxygen sensor 75 as the oxygen detecting means. The thermostat 71 is constituted such that its predetermined temperature can be adjusted arbitrarily. The thermostat 71, the humidity sensor 72, the carbon dioxide sensor 73, the ethylene sensor 74, the oxygen sensor 75 and the motor 27 for driving the compressor of the cooling mechanism 21 are connected to the controller 70. If it is determined, as the result of the detection by the oxygen sensor 75, that the oxygen concentration within the storing volume 2 is too low, then the valve 67 is opened, the valves 43, 44 are closed at the same time, and the motor 35 is activated to drive the compressor 34, so that the external air sucked in through the inlet 41 can be blown to the air outlet 66 through the tube 65, the pressure reducing valve 68 and the flow regulating valve 69, thereby ultimately filling the air into the storing volume 2 through the air outlet 66.

A lighting lamp 76 is installed within the storing volume 2, so that the visible light is shed on the fresh food stored therein. This lighting lamp 76 is lighted for a predetermined time by means of a timer 81. If the lighting lamp 76 is lighted, the light therefrom causes photosynthesis in the stored fresh foods. When such photosynthesis is carried out, oxygen is generated and therefore the oxygen concentration within the storing volume 2 is increased, resulting in that the respiration of the fresh foods can be reduced, inhibited or stopped, thereby contributing to the long term storing of the foods.

A humidifier 77 is installed at an upper position of the storing volume, and this humidifier 77 is for humidifying the storing volume when the humidity within the storing volume drops below the predetermined level. The water reservoir of the humidifier is detachably attached for filling with water. The main reason why the humidifier 77 is installed at an upper position of the storing volume is for preventing the circulation of the humidity state, and for making the moisture generated from the humidifier 77 descend toward the lower portion of the storing volume.

A fan 78, serving as a gas circulator, is installed at an upper position of the storing volume, the fan 78 facing the upper opening 19. Therefore, if the fan 78 is driven, the gas in the space 22 between the separating wall 18 and the rear wall 17 is sucked away, thereby forming a flow of gas through the upper opening 19 end in the direction of the arrow W. Accordingly, a uniformity of gas concentration, temperature and humidity within the storing volume can be realized. This makes it possible to arbitrarily choose the positions of the thermostat 71, the oxygen sensor 75, the humidity sensor 72, the carbon dioxide sensor 73, and the ethylene sensor 74 within the storing volume 2. The lighting lamp 76, the humidifier 77 and the fan 78 are connected to the controller 70. The storing volume 2 is also provided with an internal lamp 79 which is lighted upon opening of the door, due to the function of a door switch 80.

The nitrogen-rich gas delivered from the nitrogen-rich gas outlet 60 into the storing volume 2 is the gas formed by concentrating the nitrogen from the external air, while the air delivered fro the air outlet 66 into the storing volume 2 is the external air. Therefore, the nitrogen-rich gas and the air blown into the storing volume have a higher temperature than the gas which has been kept within the storing volume 2. For this reason, there arises the need for efficiently cooling the nitrogen-rich gas and the air which are being introduced into the storing volume. For this purpose, the nitrogen-rich gas outlet 60 as the leading end of the tube 59 and the air outlet 66 as the leading end of the tube 65 are disposed between the evaporation mechanism 23 and the lower opening 20, and therefore, most of the nitrogen-rich gas and the air having a high temperature and blown into the storing volume through the nitrogen-rich gas outlet 60 and the air outlet 66 respectively are sucked upwardly by the circulating action of the fan 78, are deprived of their heat by the evaporation mechanism 23, and come downwardly while riding the flow of gas from the upper opening 19, thus being circulated within the storing volume. Accordingly, the nitrogen-rich gas and the air blown into the storing volume 2 through the nitrogen-rich gas outlet 60 and the air outlet 66 respectively are efficiently and effectively cooled.

A pressure regulating means 83 is installed at a lower position of the storing volume 2, and this pressure regulating means 83 comprises a discharge hole 84 reaching the outside of the storing volume 2, a container 85 connected to the discharge hole 84, and a tube 86 inserted into the container 85. The container 85 stores water. If the pressure within the storing volume 2 drops below the predetermined level, the water level within the container 85 is positioned higher than the lower end of the tube 86, and therefore, the leaking of the gas from the storing volume to the outside can be prevented, as well as preventing the intrusion of the external air into the storing volume through the discharge hole 84. On the other hand, if the pressure within the storing volume is raised due to the fact that the nitrogen-rich gas is introduced through that nitrogen-rich gas outlet 60 during the actuation of the nitrogen supplying device, or due to the fact that the air is introduced through the air outlet 66, then the water level falls below the lower end of the tube 86 due to the pressure acting on the water surface within the container 95, and therefore the tube 86 and the discharge hole 84 will together form a through passage. Accordingly, the gas within the storing volume 2 is naturally discharged through the tube 80 and the discharge hole 84. Further, in order to assure safety, the box 1 is provided with a safety valve 87 which is activated when the pressure within the storing volume is excessively raised due to a malfunction of the pressure regulating means 83, in order to discharge the excessive gas out of the storing volume 2.

The box 1 is provided with a by-pass path 90 having an outlet 89 and an inlet 88 which is open to the interior of the storing volume 2. At an intermediate position of the by-pass path 90, there is provided an attachment means 91 external to the storing volume for detachably installing an ethylene removing member 92 which is composed of either a chemical absorbing agent such as potassium permanganate or a physical absorbing agent such as an active carbon. Further, the by-pass path is provided with a pump 93 toward the inlet side from the attachment means 91, and this pump 93 is driven by a motor 94, which is in turn connected to the controller 70. If the motor 94 is activated to drive the pump 93, the gas within the storing volume 2 is sucked into the by-pass path 90 through the inlet 88 in order to flow through the ethylene removing member 92, thereby removing the ethylene contained in the nitrogen-rich gas. The nitrogen-rich gas after removal of the ethylene returns through he outlet 89 into the storing volume 2.

Figure 4:
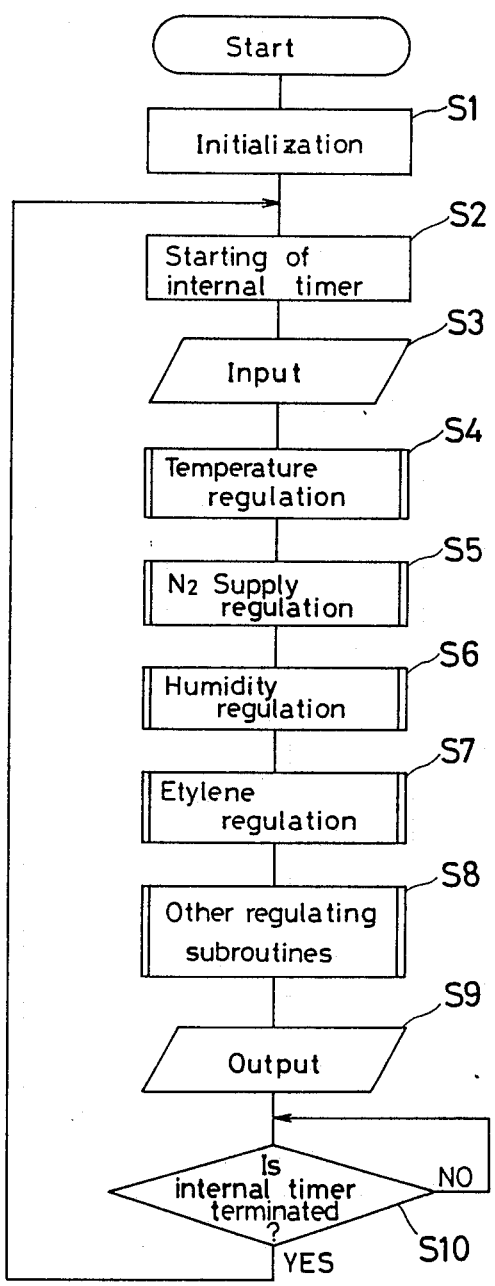
FIG. 4 is a flow chart showing the main routine operated by the CPU.

FIG. 4 is a flow chart showing the main routine of the CPU constituting the controller 70. A shown in FIG. 4, an initial state is set up by connecting the power source at the step S1. Then the internal timer of the CPU is started at the step S2 for determining the length of one routine; input signals from the different sensors are received at the step S3; the temperature regulating subroutine is operated at the step S4; the nitrogen supply regulating subroutine is operated at the step S5; the temperature regulation subroutine is operated in step S6; the ethylene regulating subroutine is operated at the step S7; the other subroutines are sequentially operated at the step S8; a controlling signal is outputted at the step S9; and at the step S10, the operation returns to the step S2 after waiting for the termination of the internal timer.

Figure 5:
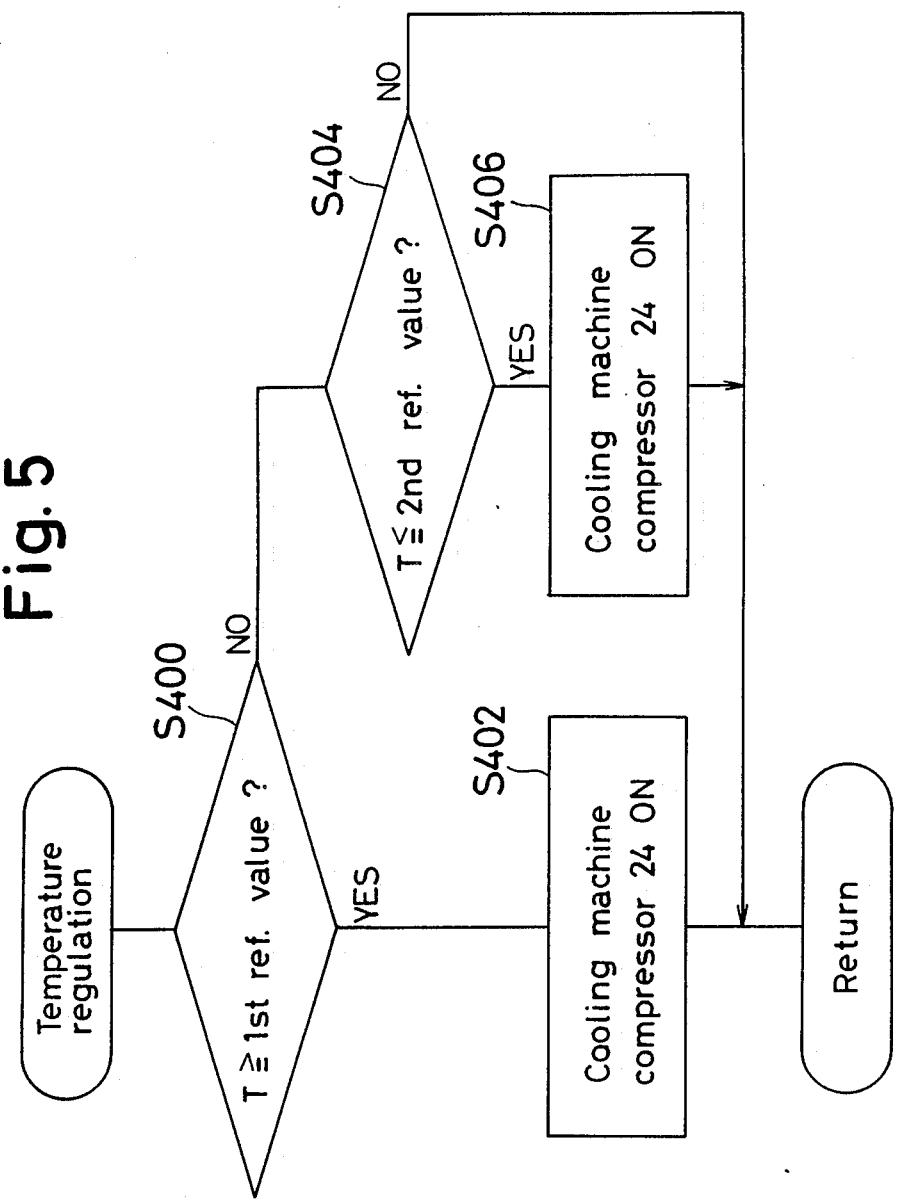
FIG. 5 is a flow chart showing the temperature regulating subroutine.

FIG. 5 is a flow chart showing the temperature regulating subroutine. As shown in FIG. 5, a judgement is made at the step S400 as to whether the temperature within the storing volume is at the reference temperature (for example 5° C.) or not, and if the actual temperature exceeds the reference temperature, the motor 27 for the compressor 24 of the cooling mechanism 21 is activated at the step S402, and then, the operation is returned to the main routine. If the result of the judgement at the step S400 shows that the temperature within the storing volume is below the reference temperature, the operation is transferred to the step S404 where a judgement is made as to whether the actual temperature corresponds to the second reference temperature (for example, 2° C.). If the actual temperature is found to be below the second reference temperature, then the motor 27 for the compressor 24 of the cooling mechanism 21 is turned off at the step S406. If the temperature within the storing volume exceeds the second reference temperature, the existing state is left without taking any action. As a result of the operation based on this flow chart, the temperature within the storing volume is maintained between the first reference temperature and the second reference temperature.

Figure 6:
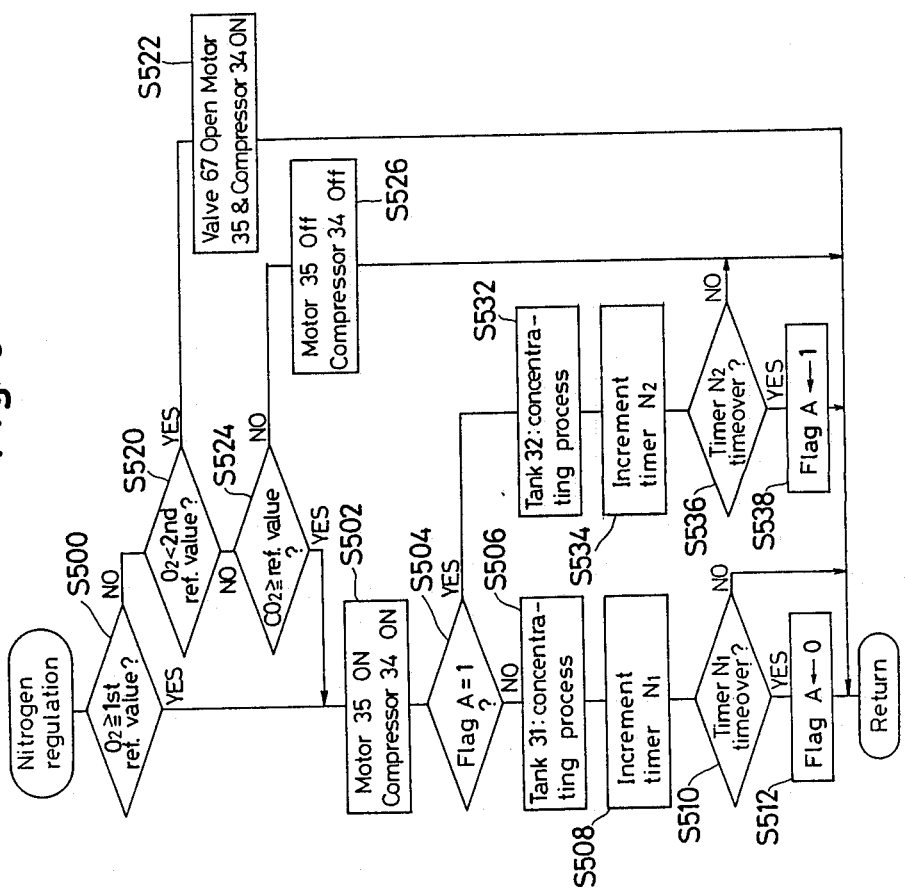
FIG. 6, is a flow chart showing the regulation of the nitrogen-rich gas supplying.

FIG. 6 is a flow chart showing the nitrogen regulating subroutine. The flag A used in this chart is a conversion flag for the first separating tank 31 and the second separating tank 32, the timer N1 is for regulating the operation time of the first separating tank 31, and the timer N2 is for regulating the operation time of the second separating tank 32. That is, the flag A is set to "0" when the nitrogen concentrating process is carried out in the first separating tank 31 and at the same time the regeneration process for the absorbing agent is carried out in the second separating tank 32. On the other hand, the flag A is set to 1 when the nitrogen concentrating process is carried out in the second separating tank 32 and at the same time the regeneration process for the absorbing agent is carried out in the first separating tank 31.

As shown in FIG. 6, a judgement is made at the step S500 as to whether the oxygen concentration within the storing volume 2 is above the reference value (for example, 10%). If it is found that the oxygen concentration within the storing volume 2 is above the reference value, then the motor 35 for the compressor 34 is turned on at the step S502 in order to activate the nitrogen rich gas supplying device 30. Then a judgement is made at the step S504 as to whether the flag A is at "1" or not. If the flag A is at "0", then the valve 43 is opened and the valves 44, 67 are closed so that the nitrogen concentrating process can be carried out in the first separating tank 31. Then the timer N1 is incremented at the step S508, and the judgement is made at the step S510 as to whether the timer N1 is timeover. If it is timeover, the flag A is set to "0" at the step S512, and the function is returned to the main routine. If the result of the judgement at the step S510 indicates that the timer is not timeover, it means that the nitrogen concentrating process is being carried out in the second separating tank 32, and therefore the function is returned to the main routine.

If the result of the judgement at the step S500 indicates that the oxygen concentration is below the first reference value (for example, 10%), then the function is transferred tot he step S520 where a judgement is made as to whether the oxygen concentration is below the second reference value (for example, 1%). If it is found that the oxygen concentration is below the second reference value, it means that the storing volume 2 is in a state of deficiency of oxygen, and therefore the function is transferred to the step S522 where the valve 67 is opened, the valves 43, 44 are closed, and the motor 35 is turned on to drive the compressor for introducing the air into the storing volume through the air outlet 66.

If the result of the judgement at the step S520 indicates that the oxygen concentration exceeds the second reference value, it means that the oxygen concentration within the storing volume is at a proper level. Therefore the function is transferred to the step S524 where a judgement is made about the concentration of carbon dioxide in the gas within the storing volume 2, and if the carbon dioxide concentration exceeds the reference value (for example, 3%), then the function is transferred to the step S502 where the motor 35 for the compressor 34 is activated in order to discharge the carbon dioxide from within the storing volume 2. Then the function is transferred to the steps S504 to S506 to perform the operations as described above. If the result of the judgement at the step S524 indicates that the carbon dioxide concentration with in the storing volume 2 is below the reference value, it means that the oxygen concentration is at a proper level and the carbon dioxide level is also quite low, and therefore the function is returned to the main routine after turning off the motor 35 and the compressor 34 at the step S526.

Based on this flow chart, if the nitrogen timers N1 and N2 are set, for example to 3 minutes, the first separating tank 31 and the second separating tank 32 will carry out the nitrogen concentrating process alternately for 3 minutes each time. As mentioned above, when one of the first separating tank 31 and the second separating tank 32 is carrying out the nitrogen concentrating process, the other one is carrying out the regenerating process, thereby making it possible to operate the nitrogen-rich gas supplying device continuously.

Figure 7:
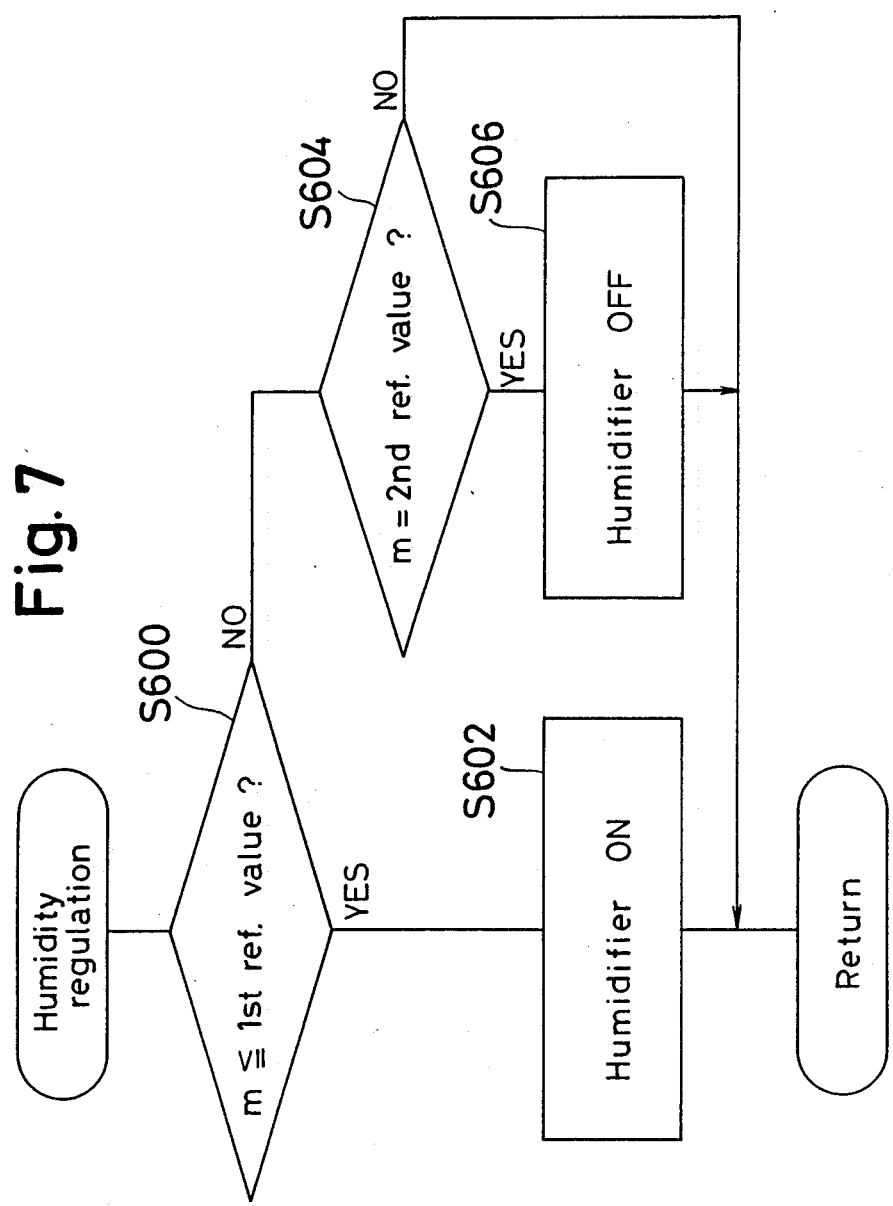
FIG. 7 is a flow chart showing the humidity regulating subroutine.

FIG. 7 is a flow chart showing the humidity regulating subroutine. As shown in FIG. 7, a judgement is made at the step S600 as to whether the humidity within the storing volume 2 is below the first reference value (for example 70%), and if it is below the first reference value, then the humidifier 77 is turned on at the step S602 after which the function is returned to the main routine. If the humidity within the storing volume 2 exceeds the first reference value, then the function is transferred to the step S604 where a judgement is made as to whether the humidity corresponds to the second reference value (for example, 100%). If it does, then the humidifier 77 is turned off at the step S606. If the result of the judgement at the step S604 indicates that the humidity does not correspond to the second reference value, then the function is returned to the main routine. As the result of the operations based on the flow chart of FIG. 7, the humidity within the storing volume 2 is maintained between the first reference value and the second reference value.

Figure 8:
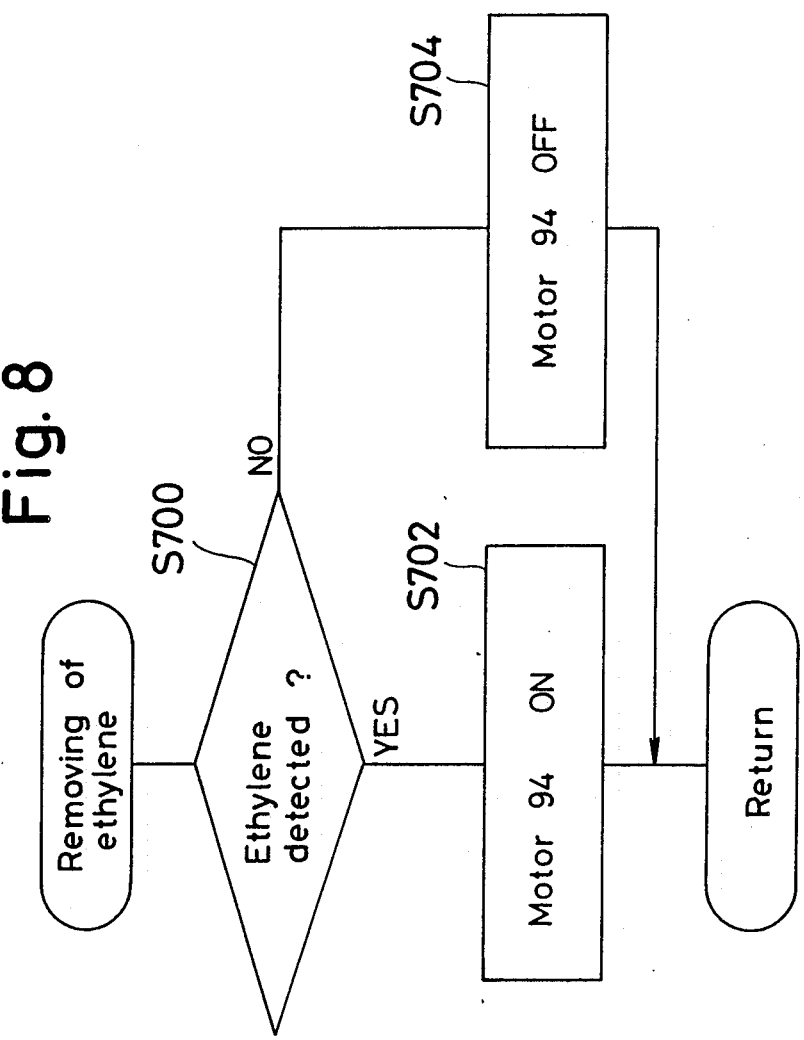
FIG. 8 is a flow chart showing the ethylene regulating subroutine.

FIG. 8 is a flow chart showing the ethylene regulating subroutine. As shown in FIG. 8, a judgement is made at the step S700 as to the existence or absence of ethylene gas. If ethylene is detected, the motor 94 is turned on at the step S702 to run the motor 94 for a predetermined time. If ethylene is not detected, the function is transferred to the step S704 where the motor 94 is turned off. As a result of the operations based on this flow chart, the ethylene within the storing volume 2 can be removed.

Unlike the device described in Japanese Patent Publication No. Sho-60-1200, the present invention does not provide a combustion type, but a bottom-installed type fresh food storing device. Therefore, the generation of CO gas or occurring of a fire is not possible and safety is assured.

In this embodiment of the present invention, if the pressure within the storing volume 2 does not reach the predetermined value, the storing volume 2 is sealed off by means of the pressure regulating means 83, thereby preventing the leaking of the gas from the storing volume 2 to the outside, and also preventing the intruding of the external air from the outside through the discharge hole 84 into the storing volume 2. Meanwhile, if the internal pressure of the storing volume 2 is increased through the introduction of the nitrogen-rich gas or the external air into the storing volume 2, the pressure regulating means 83 causes the internal gas of the storing volume 2 to be discharged through the discharge hole 84 to the outside, thereby preventing the excessive increasing of the internal pressure of the storing volume 2. Further, in this embodiment, the nitrogen-rich gas supplying device 30 is activated in response to the detection signal from the oxygen sensor 75 so that the nitrogen-rich gas is delivered through the nitrogen-rich gas outlet 60, or the external air is delivered through the air outlet 66 which is the leading end of the tube 65. Therefore, the oxygen concentration within the storing volume 2 can be maintained between the first oxygen reference value and the second oxygen reference value (for exampl together between 1 and 10%), so that the respiration of the fresh food such as vegetables and the like can be inhibited, thereby making the device of the present invention suitable for storing fresh foods in a fresh state and capable of preventing rotting.

Further, in this embodiment of the present invention, the gas within the storing volume 2 can be circulated by means of the fan 78, and therefore, a uniform temperature, humidity and gas distribution can be achieved, thereby contributing to keeping the stored fresh food in a fresh state. Because the internal gas distribution is uniform, the positions for installing the thermostat 71, the humidity sensor 72, the ethylene sensor 74, the carbon dioxide sensor 73 and the like can be freely chosen.

Further in this embodiment of the present invention, as mentioned above, the separating wall 18 having the upper opening 19 and the lower opening 20 is installed within the storing volume 2, the evaporation mechanism 23 of the cooling unit 21 is disposed in the space 22 between the separating wall 18 and the rear wall 17 of the storing volume 2, and the fan 78 is installed in the upper opening 19 of the separating wall 18. Therefore, the nitrogen-rich gas from the nitrogen-rich gas outlet 60 and the external air from the air outlet 66 having a higher temperature than the internal gas of the storing volume 2 can be effectively and efficiently cooled by means of the evaporation mechanism 23. Therefore the internal temperature of the storing volume 2 can be easily maintained at a low level.

Further, although the interior of the storing volume 2 which is kept at a low temperature can easily produce a dry atmosphere, the device of the present invention is designed such that the humidity within the storing volume will be maintained between the first reference humidity value and the second reference humidity value (for example, 70 to 100%), thereby inhibiting evaporation from the fresh foods and the drying of the fresh foods, and ultimately contributing to keeping vegetables, fruits and the like in a fresh state.

Further, in this embodiment of the present invention, the level of carbon dioxide within the storing volume 2 is kept below the predetermine value, and this brings about the result that the deterioration of fresh foods by carbon dioxide can be prevented, and that the respiration of fresh foods can be inhibited, thereby contributing to keeping the fresh foods in a fresh state.

Further, when fruits or vegetables are stored, they produce ethylene which is a maturing endocrine for prompting the maturing of fruits and vegetables. Therefore, if fruits and vegetables are stored too long time, they become too ripe. But because the device of the present invention can positively remove the ethylene, an excessive maturing of fruits and vegetables can be prevented, thereby also contributing to keeping the fresh foods in a fresh state.

Further, the embodiment of the present invention is constituted such that photosynthesis by the vegetables and the like is prompted by irradiating visible light by means of the lighting lamp 76. Therefore, even if the oxygen within the storing volume 2 is depleted, oxygen is generated within the storing volume due to photosynthesis. Thus, oxygen is self supplied, and the irradiating of visible light can become a means for controlling the respiration rate of the fresh foods.

The function of the discharge hole 84 is not limited to discharging the internal gas of the storing volume 2 to the outside, but extends to serving as a drain hole for the water collected at the bottom of the storing volume 2. Further the discharge hole 84 and the air inlet 41 of the tube 39 can be disposed in a vicinity each other, so that the gas discharged through the discharge hole 84 and having a relatively low temperature and a high concentration of nitrogen can be sucked into the air inlet 41 of the tube 39. It is of course possible that the nitrogen buffer tank 33 can be a laterally long type depending on circumstances for the sake of utilizing the dead space within the box 1.

Figure 9:
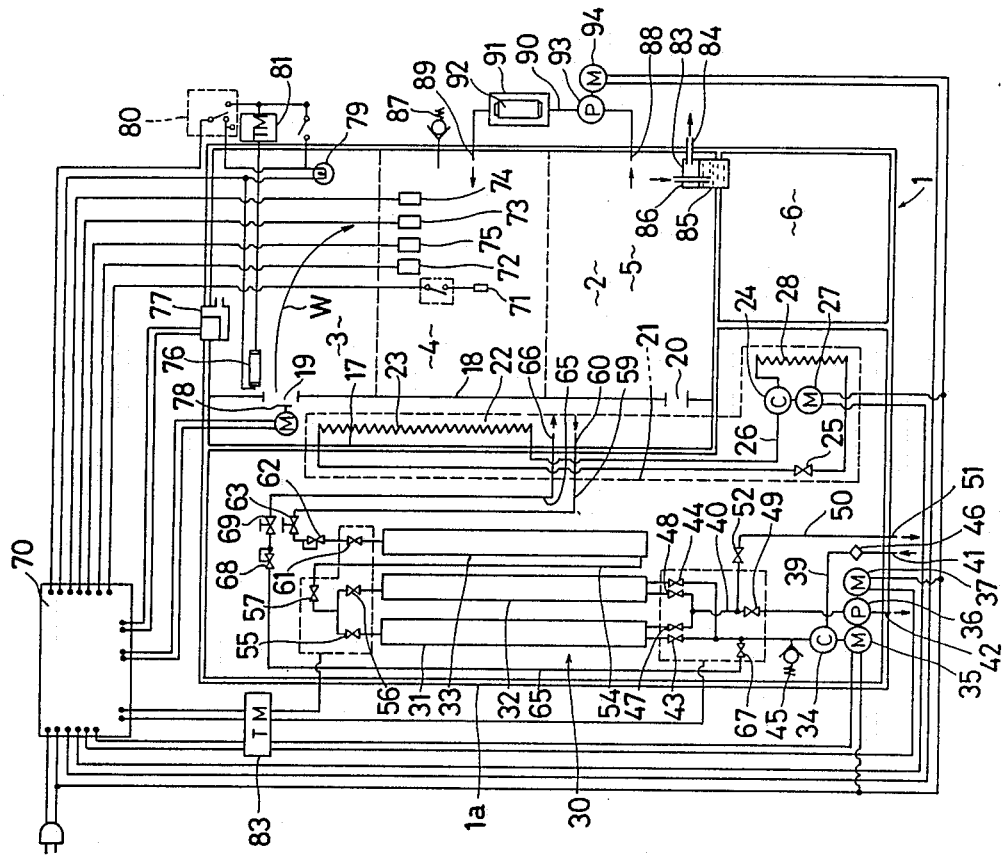
FIG. 9 is an exemplary view of another embodiment of the present invention showing the internal structure of the fresh food storing device.

A second embodiment of the present invention is illustrated in FIG. 9, and this embodiment has substantially the same constitution as the first embodiment of the present invention, as well as having a substantially the same function and effect, except that the controller 70 of the second embodiment is provided with a timer 83. Owing to the function of this timer 83, the motor 35 and the compressor 34 are activated intermittently for a predetermined time each time, so that the nitrogen-rich gas supplying device 30 may be operated intermittently for filling the nitrogen-rich gas into the storing volume 2 intermittently through the nitrogen-rich gas outlet 60. due to this arrangement, the oxygen level within the storing volume 2 can be maintained almost at a constant level. With this arrangement, the oxygen sensor 75 which is provided in the first embodiment of the present invention is not required.

Now the effect of the present invention will be described. Unlike the device disclosed in Japanese Patent Publication No. Sho-60-1200, the device of the present invention as described above does not provide a combustion type fresh food storing device, but a bottom installing type fresh food storing device. Therefore the generation of CO gas and occurring of a fire are not possible, thereby assuring safety. Further, according to he device of the present invention, the nitrogen-rich gas supplying device is activated in response to the variation of the state of the gas within the storing volume, and therefore a nitrogenrich gas can always be maintained within the storing volume, so that the respiration of the fresh foods such as vegetables and the like can be inhibited, thereby contributing to keeping the fresh foods in a fresh state, and preventing rotting. Further, in the case where a pressure regulating means is installed in the device of the present invention, the leaking of the cooled nitrogen-rich gas from the interior of the storing volume to the outside can be prevented. In the same manner, the intruding of the external air through the discharge hole into the storing volume can also be prevented. Therefore, frequent activations of the nitrogen-rich gas supplying device and the cooling mechanism are not required, and therefore, problems such as energy wastage and the like arising from such frequent operations can be avoided. In this respect, the device of the present invention is different from the vertical gas flowing type as provided in the large scale cooling plant disclosed in Japanese Patent Publication No. Sho-59-14749.

Further in the fresh food storing device of the present invention, a separating wall having a first opening and a second opening is installed within the storing volume, and the evaporation mechanism of the cooling unit is disposed in the space between the separating wall and the partitioning walls. Therefore, in the case where a circulating device is installed in the first opening of the separating wall, the nitrogenrich gas blown in through the nitrogen-rich gas outlet of the nitrogen-rich gas supplying device can be efficiently cooled. Therefore, the temperature of the storing volume can be effectively maintained at a low level.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. A fresh food storing device comprising:
   means defining a storing volume for storing fresh foods;
   a box surrounding said storing volume;
   a temperature detecting means installed in said box for sensing the temperature of the gas within said storing volume;
   cooling means installed in said box for cooling said storing volume;
   a nitrogen-rich gas supplying means installed in said box for supplying a nitrogen-rich gas into said storing volume;
   a controller having means for activating said cooling means in response to a signal from said temperature detecting means for controlling the temperature of said storing volume, and means for activating said nitrogen-rich gas supplying means in response to a variation of the gas content of said storing volume for controlling the gas content of said storing volume; and
   gas circulating means for circulating the gas in said storing volume,
   wherein said storing volume is elongate in height and is provided with a separating wall which has a first opening and a second opening, and wherein said nitrogen-rich gas supplying means is disposed between said partitioning means and said box, an evaporation means of said cooling means is disposed between said first and second openings, a nitrogen-rich gas outlet for said nitrogen-rich gas supplying means is disposed between said evaporation means and said second opening, and said gas circulation means is disposed near said first opening.

2. The fresh food storing device as claimed in claim 1, including an oxygen concentration detecting means for detecting the oxygen concentration within the storing volume in said box, wherein said means for activating the nitrogen-rich gas supplying means is responsive to a signal from said oxygen concentration detecting means in order to supply the nitrogen-rich gas into said storing volume.

3. The fresh food storing device as claimed in claim 2, further including an oxygen supplying means for supplying an oxygen-containing gas into the storing volume, wherein said controller includes means for activating said oxygen supplying means when said oxygen concentration detecting means detects an oxygen concentration below a reference value and for activating said nitrogen-rich gas supplying means when the oxygen concentration is found to be above the reference value.

4. The fresh food storing device as claimed in claim 1, wherein said controller has means for intermittently activating said nitrogen-rich gas supplying means as a function of time.

5. The fresh foods storing device as claimed in claim 1, wherein said nitrogen-rich gas supplying means includes a separating tank having an oxygen absorbing means, and also includes a compressor for supplying external air into said separating tank under pressure.

6. The fresh food storing device as claimed in claim 1 further including a carbon dioxide concentration detecting means for detecting the carbon dioxide concentration within said storing volume, wherein said controller has means for activating said nitrogen-rich gas supplying means when the carbon dioxide concentration is found to be above a reference value.

* * * * *

UNITED STATES PATENT AND TRADEMARK OFFICE
CERTIFICATE OF CORRECTION

PATENT NO. : 4,961,322

DATED : OCTOBER 9, 1990

INVENTOR(S) : TOMIO OGUMA ET AL.

It is certified that error appears in the above-identified patent and that said Letters Patent is hereby corrected as shown below:

On the title page:

In the Assignee, please delete "Aisin Seiki Kabushiki Kuisha" and insert --Aisin Seiki Kabushiki Kaisha--.

Signed and Sealed this

Twenty-first Day of April, 1992

Attest:

HARRY F. MANBECK, JR.

*Attesting Officer*  *Commissioner of Patents and Trademarks*